US009215630B2

(12) United States Patent
Chaudhuri et al.

(10) Patent No.: US 9,215,630 B2
(45) Date of Patent: Dec. 15, 2015

(54) METHOD AND SYSTEM FOR CREATING A GLOBAL NEIGHBOR LIST

(71) Applicant: Wipro Limited, Bangalore (IN)

(72) Inventors: Saptarshi Chaudhuri, Bangalore (IN); Kamakshi Lakshminarayanpuram Krishnakumar, Bangalore (IN)

(73) Assignee: Wipro Limited, Bangalore (IN)

( * ) Notice: Subject to any disclaimer, the term of this patent is extended or adjusted under 35 U.S.C. 154(b) by 0 days.

(21) Appl. No.: 14/301,720

(22) Filed: Jun. 11, 2014

(65) Prior Publication Data

US 2015/0312812 A1 Oct. 29, 2015

(30) Foreign Application Priority Data

Apr. 29, 2014 (IN) .......................... 2158/CHE/2014

(51) Int. Cl.
H04W 36/00 (2009.01)
H04W 24/10 (2009.01)
(52) U.S. Cl.
CPC .......... *H04W 36/0061* (2013.01); *H04W 24/10* (2013.01)
(58) Field of Classification Search
CPC ............................... H04L 63/08; H04W 12/08
See application file for complete search history.

(56) References Cited

U.S. PATENT DOCUMENTS

| 8,619,788 | B1* | 12/2013 | Sankaran | H04L 45/66 370/389 |
| 8,675,664 | B1* | 3/2014 | Kamath | H04L 12/287 370/395.5 |
| 2006/0126580 | A1* | 6/2006 | Katsumata | H04L 47/10 370/338 |
| 2006/0141939 | A1* | 6/2006 | Nakada | H04W 52/30 455/69 |
| 2009/0285215 | A1* | 11/2009 | Kaippallimalil | H04L 29/12028 370/392 |
| 2014/0248876 | A1* | 9/2014 | Yang | H04W 36/0083 455/436 |
| 2015/0089216 | A1* | 3/2015 | Benoit | H04L 63/0823 713/156 |

* cited by examiner

*Primary Examiner* — Bobbak Safaipour
(74) *Attorney, Agent, or Firm* — LeClairRyan, a Professional Corporation

(57) ABSTRACT

A method and system for creating a global neighbor list is disclosed. The method may be implemented at a serving base station and includes instructing each Mobile Station (MS) served by the serving BS to report a signal strength between the each MS and one or more neighbor BSs for one or more predefined time periods; identifying, using a hardware processor, at least one neighbor BS of the one or more neighbor BSs having a signal strength with respect to one or more MSs greater than a threshold signal strength; determining, using the hardware processor, a number of times the at least one neighbor BS is reported in the one or more predefined time periods; and creating, using the hardware processor, the global neighbor list based on the number of times the at least one neighbor BS is reported exceeding a predefined count threshold.

15 Claims, 3 Drawing Sheets

Example Computer System

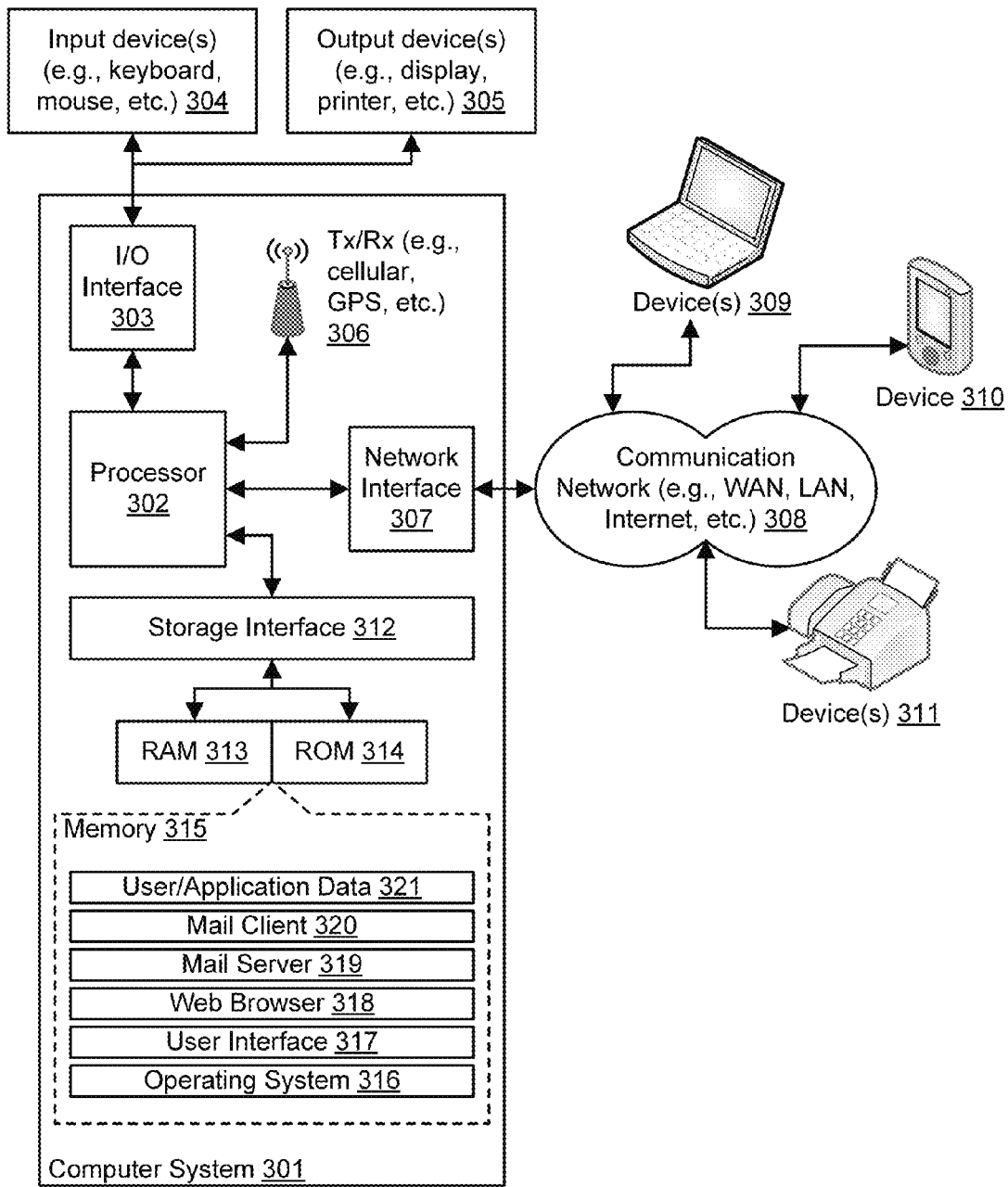
FIG. 3: Example Computer System

METHOD AND SYSTEM FOR CREATING A GLOBAL NEIGHBOR LIST

This application claims the benefit of Indian Patent Application No. 2158/CHE/2014 filed Apr. 29, 2014, which is hereby incorporated by reference in its entirety.

FIELD

This disclosure relates generally to neighbor list management in a cellular telecommunication network and more particularly to a method and system of maintaining relevant neighbor base stations in the neighbor list.

BACKGROUND

Typically, in a cellular telecommunication network, a Base Station (BS) maintains a Global Neighbor List (GNL) which includes a list of neighbor BSs in the vicinity of the particular BS. The GNL may be transmitted to each Mobile Station (MS) currently being served by the BS. On receiving the GNL, each MS may search for the neighbor BSs listed in the GNL and report a signal strength measurement between itself and the neighbor BSs. Based on these reports, the serving BS may determine a neighbor BS to which a MS may be potentially handed over.

The GNL may usually be manually defined by a network administrator and provided to the BS. The network administrator may identify BSs surrounding a particular BS from a network map and provide this list to the BS. This list of neighbor BSs may typically involve a large number of neighbors that may or may not be relevant to all the MSs within a serving area or cell. In other words, not all the neighbor BSs may be of equal importance to a particular MS. Also, since the GNL is manually defined, it may only be updated on a weekly or monthly basis. Thus, any changes in the network topography such as addition or removal of BSs may not be immediately reflected in the GNL. In such cases, if a BS that has been removed or is currently inactive is included in the GNL, then each MS may spend undue resources searching for the BS in order to measure signal strength between itself and the BS. This may cause battery drain at the MS. Further, a similar problem may occur when the GNL includes a large number of neighbor BSs and the MS is instructed to measure signal strength between itself and each of these neighbor BSs. Processing the large number of neighbors by the MSs may be processor intensive leading to high battery consumption.

SUMMARY

In one embodiment, a method of creating a global neighbor list in a cellular telecommunication network is disclosed. The method may be implemented at a serving Base Station (BS). The method comprises: instructing each Mobile Station (MS) served by the serving BS to report a signal strength between the each MS and one or more neighbor BSs for one or more predefined time periods; identifying, using a hardware processor, at least one neighbor BS of the one or more neighbor BSs having a signal strength with respect to one or more MSs greater than a threshold signal strength; determining, using the hardware processor, a number of times the at least one neighbor BS is reported in the one or more predefined time periods; and creating, using the hardware processor, the global neighbor list based on the number of times the at least one neighbor BS is reported exceeding a predefined count threshold.

In another embodiment, an apparatus for creating a global neighbor list is disclosed. The apparatus may be implemented at a serving Base Station (BS) and may comprise a processor and a memory disposed in communication with the processor and storing processor-executable instructions, the instructions comprising instructions to: instruct each Mobile Station (MS) served by the serving BS to report a signal strength between the each MS and one or more neighbor BSs for one or more predefined time periods; identify at least one neighbor BS of the one or more neighbor BSs having a signal strength with respect to one or more MSs greater than a threshold signal strength; determine a number of times the at least one neighbor BS is reported in the one or more predefined time periods; and create the global neighbor list based on the number of times the at least one neighbor BS is reported exceeding a predefined count threshold.

In yet another embodiment, a non-transitory, computer-readable medium storing instructions that, when executed by a processor, causes the processor to create a global neighbor list is disclosed.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIG. 3 is a block diagram of an exemplary computer system for implementing embodiments consistent with the present disclosure.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
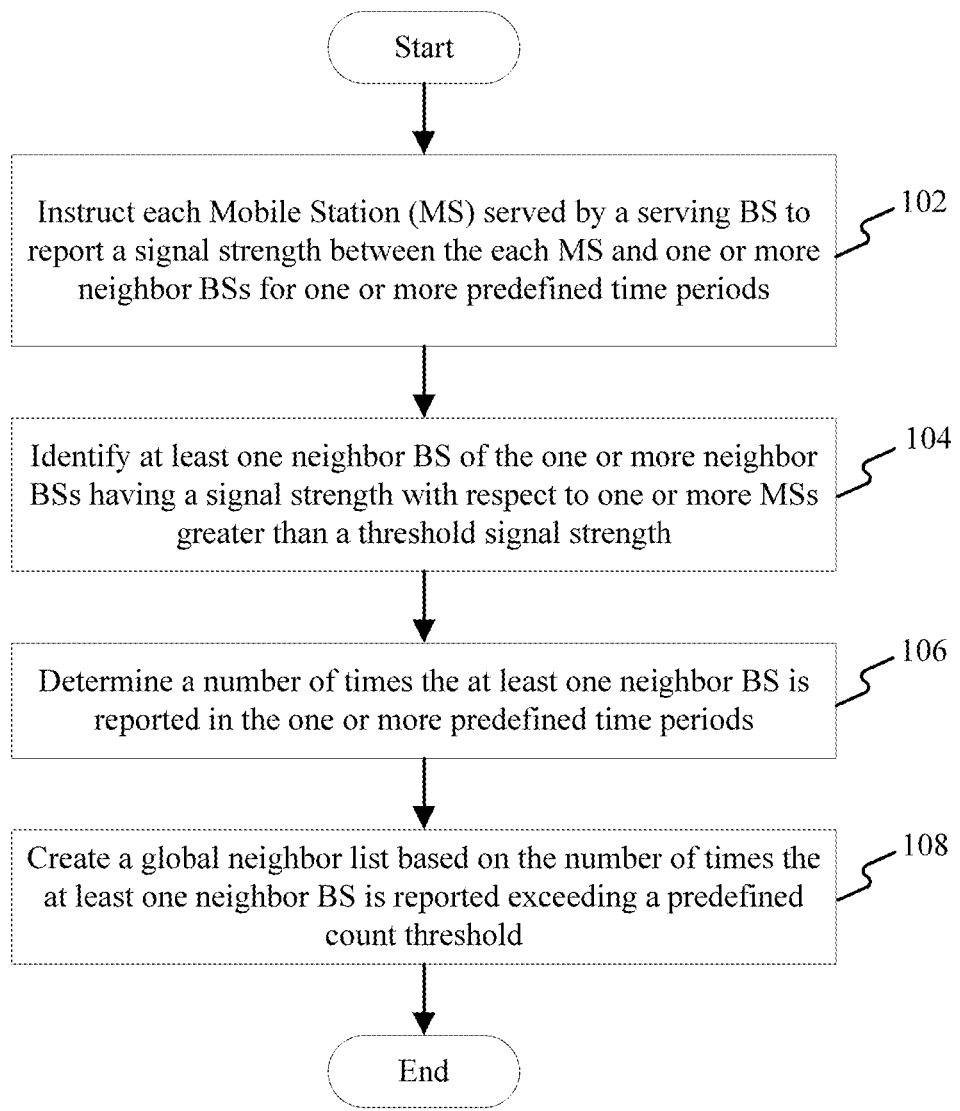
FIG. 1 illustrates a flow chart of a method of creating a global neighbor list in a cellular telecommunication network according to some embodiments of the present disclosure.

FIG. 1 illustrates a flow chart of a method of creating a global neighbor list in a cellular telecommunication network in accordance with some embodiments of the present disclosure. The method may be implemented at a serving Base Station (BS). Here, the terminology "serving BS" is used to refer to a BS serving one or more Mobile Stations (MSs) or User Equipment (UE). The method may include instructing each MS served by the serving BS to report a signal strength between itself and one or more neighbor BSs at step 102. A MS may search for one or more neighbor BSs from which the MS receives a signal and accordingly measure the relative signal strength between itself and the one or more neighbor BSs. In some embodiments, the relative signal strength may correspond to Reference Signal Received Power (RSRP)

value. Each MS may send a measurement report including details of the neighbor BSs and the corresponding relative signal strength between the MS and the neighbor BSs to the serving BS.

The MS may be instructed to discover and report on neighbor BSs for a predefined period of time. The period of time may be defined by the network administrator and may be such that sufficient readings are collected so as to average out the readings. In some embodiments, the MSs may be instructed to measure and report signal strength in multiple time slots or windows. Thus, an MS may be instructed to report signal strength multiple times in a single time slot and perform this same operation across multiple time slots.

Once the various signal strength values between various MSs and various BSs are collected, the various signal strength values may be compared against a predefined threshold signal strength value. The threshold signal strength value may be predefined by the network administrator. Thereafter, one or more neighbor BSs that exceed the threshold signal strength value may be identified at step 104. The predefined threshold value may be set such that any neighbors reported that have low signal strength with respect to a MS may be eliminated. Further, the threshold signal strength value may ensure that neighbors whose signal strength is so weak that a handover is unlikely to happen to these neighbors are eliminated from consideration.

On identifying the one or more neighbor BSs exceeding the threshold signal strength, the number of times each neighbor BS is reported by the MSs may be determined at step 106. Thus, a cumulative count of the neighbors as reported by the MSs in the serving area of the serving BS may be determined. Thereafter, the number of times a BS is reported may be compared against a predefined count threshold. In some embodiments, the count threshold may be determined based on the number of the predefined time periods, a Minimum Percentage Neighbor Retention value and the total number of connected MSs. The minimum percentage neighbor retention value itself may be predefined and may indicate a percentage value of the identified neighbor BSs to be retained. If the number of times the BS is reported by the MSs is greater than or equal to the predefined count threshold, then a global neighbor list may be created and the BS included in the global neighbor list at step 108.

The created global neighbor list may then be transmitted to a Management Server to validate the global neighbor list. The management server may verify the created global neighbor list against a default neighbor list maintained by the management server. In some embodiments, if the created global list is a subset of the default neighbor list, then the created global list may be validated. If the Management server replies with its version of the default Neighbor List created by the network administrator, then the difference between the created neighbor list by the BS and the version of the neighbor list provided by the management server may be reported back to the management server.

Figure 2:
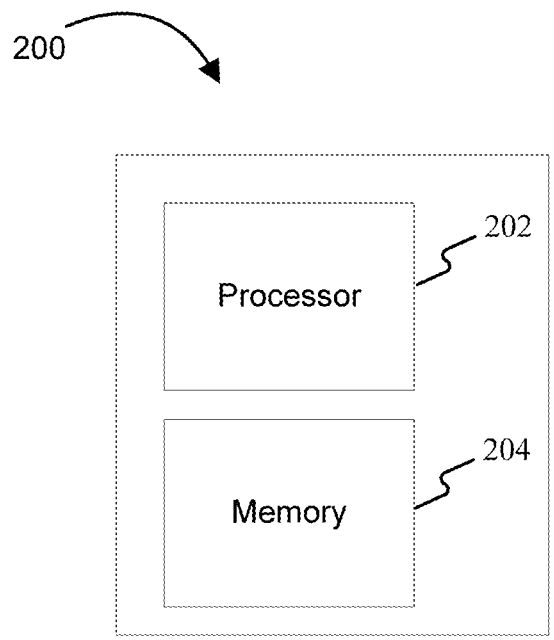
FIG. 2 is a functional block diagram of an apparatus for creating a global neighbor list according to some embodiments of the present disclosure.

FIG. 2 illustrates a functional block diagram of an apparatus 200 for creating a global neighbor list according to some embodiments of the present disclosure. Apparatus 200 may be implemented at a serving Base Station (BS) and may include a processor 202 and a memory 204 disposed in communication with the processor 202 and storing processor-executable instructions. The instructions may comprise instructions to instruct each Mobile Station (MS) served by the serving BS to report a signal strength between the each MS and one or more neighbor BSs for one or more predefined time periods. In some embodiments, the relative signal strength may correspond to Reference Signal Received Power (RSRP) value.

Processor 202 may instruct each MS to discover and report on neighbor BSs for a predefined period of time. The period of time may be defined by the network administrator and may be such that sufficient readings are collected so as to average out the readings. In some embodiments, the MSs may be instructed to measure and report signal strength in multiple time slots or windows. Thus, an MS may be instructed to report signal strength multiple times in a single time slot and perform this same operation across multiple time slots.

Once the various signal strength values between various MSs and various BSs are collected, processor 202 may compare the various signal strength values against a predefined threshold signal strength value. The threshold signal strength value may be predefined by the network administrator. Thereafter, processor 202 may identify one or more neighbor BSs that exceed the threshold signal strength value. The predefined threshold value may be set such that any neighbors reported that have low signal strength with respect to a MS may be eliminated. Further, the threshold signal strength value may ensure that neighbors whose signal strength is so weak that a handover is unlikely to happen to these neighbors are eliminated from consideration.

On identifying the one or more neighbor BSs exceeding the threshold signal strength, processor 202 may determine the number of times each neighbor BS is reported by the MSs. Thus, a cumulative count of the neighbors as reported by the MSs in the serving area of the serving BS may be determined. Thereafter, the number of times a BS is reported may be compared against a predefined count threshold by processor 202. In some embodiments, the count threshold may be determined based on the number of the predefined time periods, a Minimum Percentage Neighbor Retention value and the total number of connected MSs. If the number of times the BS is reported by the MSs is greater than or equal to the predefined count threshold, then a global neighbor list may be created and the BS included in the global neighbor list.

The created global neighbor list may then be transmitted to a Management Server through a transmitter to validate the global neighbor list. The management server may verify the created global neighbor list against a default neighbor list maintained by the management server. In some embodiments, if the created global list is a subset of the default neighbor list, then the created global list may be validated. If the Management server replies with its version of the default Neighbor List created by the network administrator, then the difference between the created neighbor list by the BS and the version of the neighbor list provided by the management server may be reported back to the management server.

FIG. 3 is a block diagram of an exemplary computer system for implementing embodiments consistent with the present disclosure. Variations of computer system 301 may be used for implementing apparatus 200. Computer system 301 may comprise a central processing unit ("CPU" or "processor") 302. Processor 302 may comprise at least one data processor for executing program components for executing user- or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 302 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 302 may be disposed in communication with one or more input/output (I/O) devices via I/O interface 303. The I/O interface 303 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 303, the computer system 301 may communicate with one or more I/O devices. For example, the input device 304 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 305 may be a printer, fax machine, video display (e.g., cathode ray tube (CRT), liquid crystal display (LCD), light-emitting diode (LED), plasma, or the like), audio speaker, etc. In some embodiments, a transceiver 306 may be disposed in connection with the processor 302. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 302 may be disposed in communication with a communication network 308 via a network interface 307. The network interface 307 may communicate with the communication network 308. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 308 may include, without limitation, a direct interconnection, local area network (LAN), wide area network (WAN), wireless network (e.g., using Wireless Application Protocol), the Internet, etc. Using the network interface 307 and the communication network 308, the computer system 301 may communicate with devices 310, 311, and 312. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 301 may itself embody one or more of these devices.

In some embodiments, the processor 302 may be disposed in communication with one or more memory devices (e.g., RAM 313, ROM 314, etc.) via a storage interface 312. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 316, user interface application 317, web browser 318, mail server 319, mail client 320, user/application data 321 (e.g., any data variables or data records discussed in this disclosure), etc. The operating system 316 may facilitate resource management and operation of the computer system 301. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 317 may facilitate display, execution, interaction, manipulation, or operation of program components through textual or graphical facilities. For example, user interfaces may provide computer interaction interface elements on a display system operatively connected to the computer system 301, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 301 may implement a web browser 318 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 301 may implement a mail server 319 stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 301 may implement a mail client 320 stored program component. The mail client may be a mail viewing application, such as Apple Mail, Microsoft Entourage, Microsoft Outlook, Mozilla Thunderbird, etc.

In some embodiments, computer system 301 may store user/application data 321, such as the data, variables, records, etc. as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

The specification has described a method and system for creating a global neighbor list. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method of optimizing cellular telecommunication networks, the method comprising:
    instructing, by a base station computing device, each of a plurality of served mobile stations to report a signal strength between the mobile station and one or more neighbor base stations for one or more predefined time periods;
    identifying, by the base station computing device, at least one neighbor base station of the one or more neighbor base stations for which the signal strength with respect to one or more of the mobile stations is greater than a threshold signal strength;
    determining, by the base station computing device, number of times the at least one neighbor base station is reported in the one or more predefined time periods;
    creating, by the base station computing device, a global neighbor list based on the number of times the at least one neighbor base station is reported exceeding a predefined count threshold; and
    validating, by the base station computing device, the global neighbor list against a default neighbor list in order to optimize a cellular telecommunication network, the validating comprising sending the global neighbor list to a management server maintaining the default neighbor list.

2. The method of claim 1, wherein the signal strength is a reference signal received power value.

3. The method of claim 1, wherein the predefined count threshold is based on one or more of a number of the one or more predefined time periods, a minimum percentage neighbor retention value, or a total number of connected mobile stations.

4. The method of claim 3, wherein the minimum percentage neighbor retention value is predefined.

5. The method of claim 1 further comprising facilitating, by the base station computing device, one or more handovers of one or more of the mobile stations using the global neighbor list.

6. A base station computing device comprising:
    a memory; and
    a processor coupled to the memory, the processor configured to execute programmed instructions stored in the memory comprising:
        instructing each of a plurality of served mobile stations to report a signal strength between the mobile station and one or more neighbor base stations for one or more predefined time periods;
        identifying at least one neighbor base station of the one or more neighbor base stations for which the signal strength with respect to one or more of the mobile stations is greater than a threshold signal strength;
        determining a number of times the at least one neighbor base station is reported in the one or more predefined time periods;
        creating a global neighbor list based on the number of times the at least one neighbor base station is reported exceeding a predefined count threshold; and
        validating the global neighbor list against a default neighbor list in order to optimize a cellular telecommunication network, the validating comprising sending the global neighbor list to a management server maintaining the default neighbor list.

7. The device of claim 6, wherein the signal strength is a reference signal received power value.

8. The device of claim 6, wherein the predefined count threshold is based on one or more of a number of the one or more predefined time periods, a minimum percentage neighbor retention value, or a total number of connected mobile stations.

9. The device of claim 8, wherein the minimum percentage neighbor retention value is predefined.

10. The device of claim 6 wherein the processor is further configured to executed one or more additional programmed instructions stored in the memory comprising facilitating one or more handovers of one or more of the mobile stations using the global neighbor list.

11. A non-transitory, computer-readable medium having stored thereon instructions for optimizing cellular telecommunication networks comprising machine executable code which, when executed by a processor causes the processor to perform steps comprising:
    instructing each of a plurality of served mobile stations to report a signal strength between the mobile station and one or more neighbor base stations for one or more predefined time periods;
    identifying at least one neighbor base station of the one or more neighbor base stations for which the signal strength with respect to one or more of the mobile stations is greater than a threshold signal strength;

determining a number of times the at least one neighbor base station is reported in the one or more predefined time periods;

creating a global neighbor list based on the number of times the at least one neighbor base station is reported exceeding a predefined count threshold; and validating the global neighbor list against a default neighbor list in order to optimize a cellular telecommunication network, the validating comprising sending the global neighbor list to a management server maintaining the default neighbor list.

12. The medium of claim 11, wherein the signal strength is a reference signal received power value.

13. The medium of claim 11, wherein the predefined count threshold is based on one or more of a number of the one or more predefined time periods, a minimum percentage neighbor retention value, or a total number of connected mobile stations.

14. The medium of claim 13, wherein the minimum percentage neighbor retention value is predefined.

15. The medium of claim 11 further comprising machine executable code which, when executed by the processor further causes the processor to perform one or more additional steps comprising facilitating one or more handovers of one or more of the mobile stations using the global neighbor list.

* * * * *